United States Patent
Borchert et al.

(10) Patent No.: US 8,287,799 B2
(45) Date of Patent: Oct. 16, 2012

(54) PROCESS FOR THE PRODUCTION OF A FUEL TANK AND A FUEL TANK

(75) Inventors: Matthias Borchert, Bonn (DE); Gerd Wolter, Konigswinter (DE); Harald Lorenz, Bad Neuenahr-Ahrweiler (DE); Dirk Eulitz, Bonn (DE); Timo Kramer, Hirz-Maulsbach (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 1442 days.

(21) Appl. No.: 11/849,451

(22) Filed: Sep. 4, 2007

(65) Prior Publication Data
US 2008/0078761 A1    Apr. 3, 2008

Related U.S. Application Data

(60) Provisional application No. 60/824,486, filed on Sep. 5, 2006.

(30) Foreign Application Priority Data

Sep. 4, 2006 (DE) .......................... 10 2006 041 837

(51) Int. Cl.
*B29C 43/02* (2006.01)
(52) U.S. Cl. ........................................ 264/545; 264/250
(58) Field of Classification Search .................. 264/545, 264/250
See application file for complete search history.

(56) References Cited

U.S. PATENT DOCUMENTS

| 4,151,976 | A | * | 5/1979 | Schurman ...................... 249/102 |
| 4,719,072 | A | * | 1/1988 | Kojima et al. ................. 264/515 |
| 5,102,865 | A | | 4/1992 | Woolf |
| 5,103,865 | A | | 4/1992 | Hyde |
| 7,867,420 | B2 | * | 1/2011 | Wolter ........................... 264/154 |
| 2002/0105115 | A1 | * | 8/2002 | Sadr ............................... 264/510 |

FOREIGN PATENT DOCUMENTS

| DE | 10237187 | 7/2003 |
| EP | 1211196 A1 | 6/2002 |
| EP | 1211196 A1 | 6/2002 |
| JP | 02070421 | 3/1990 |
| JP | 02113919 | 4/1990 |
| JP | 06285963 | 10/1994 |
| WO | 2006008308 | 1/2006 |

* cited by examiner

*Primary Examiner* — Christina Johnson
*Assistant Examiner* — Galen Hauth
(74) *Attorney, Agent, or Firm* — Grossman, Tucker, Perreault & Pfleger, PLLC

(57) ABSTRACT

The invention concerns a process for the production of a container, in particular a fuel tank of thermoplastic material, by extrusion blow molding, wherein during shaping of the container within a multi-part tool the container is provided with at least one connecting element passing through the wall thereof, wherein with at least a part of the connecting element as a lost shaping male die the wall of the container is displaced from one side into a tool placed on the oppositely side of the container wall and removed.
The invention further concerns a fuel tank with at least one connecting element which is connected to the tank wall at least in region-wise manner by intimate joining of the materials involved.

6 Claims, 9 Drawing Sheets

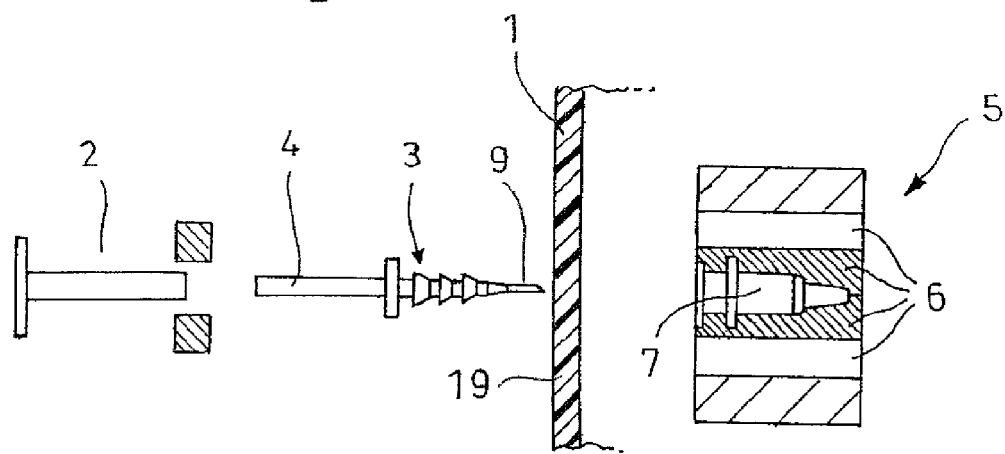
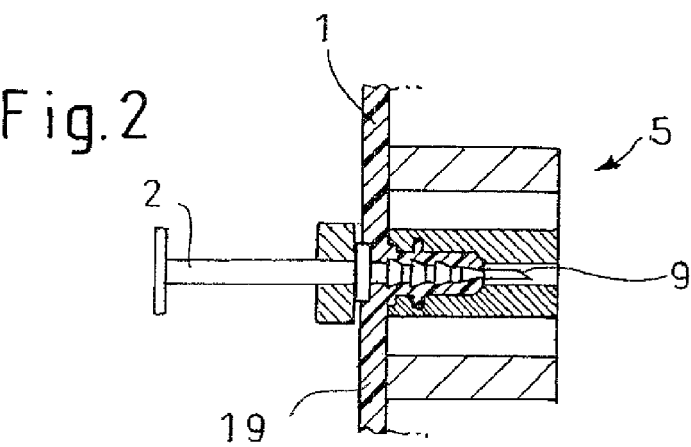

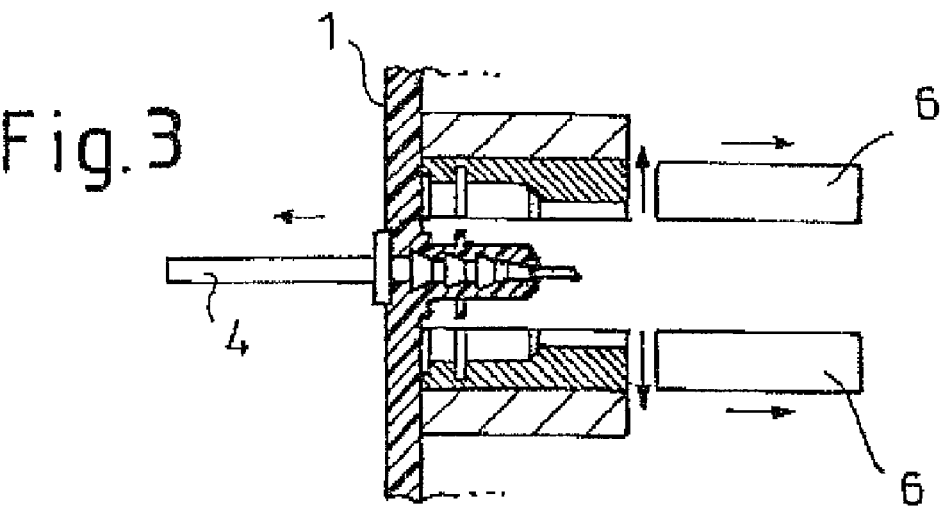
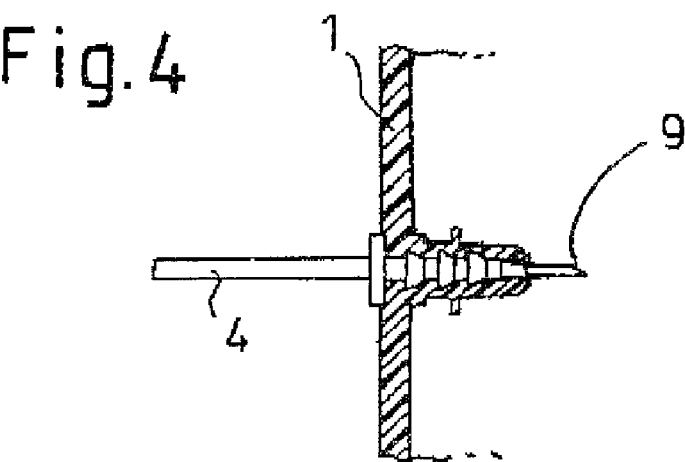

Fig.5
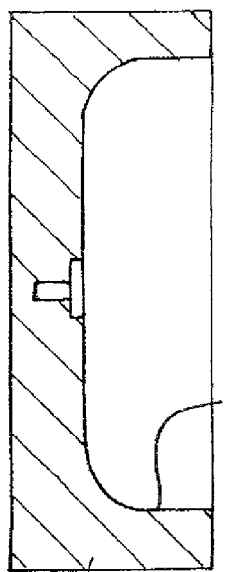
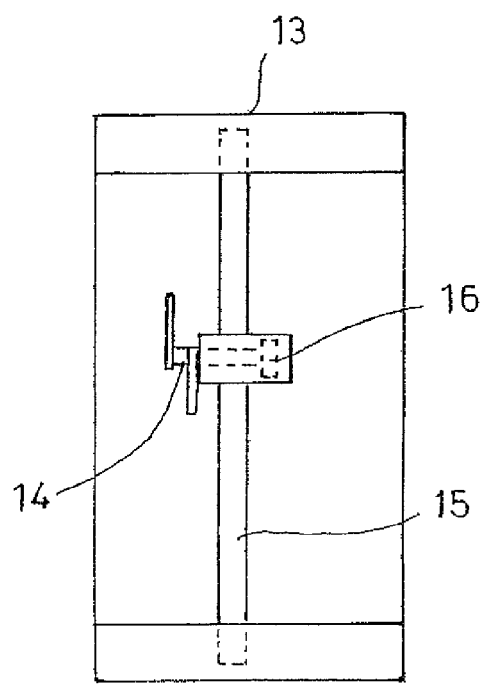
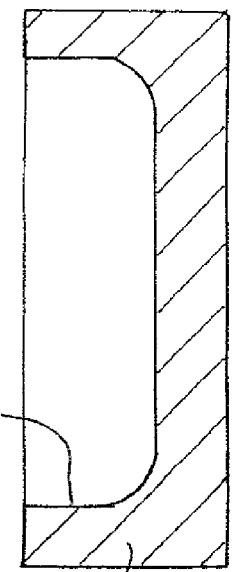

PROCESS FOR THE PRODUCTION OF A FUEL TANK AND A FUEL TANK

CROSS-REFERENCE TO RELATED APPLICATIONS

This application claims priority to U.S. Provisional Application 60/824,486 filed Sep. 5, 2006.

FIELD

The invention concerns a process for the production of a container, in particular a fuel tank of thermoplastic material, by extrusion blow molding.

The invention further concerns a fuel tank of thermoplastic material.

BACKGROUND

Fuel tanks of thermoplastic materials are in principle to be impermeable in relation to hydrocarbons. They are usually produced from multi-layer co-extrudates which include barrier layers for hydrocarbons. The plastic materials used for the production of plastic fuel tanks, for example polyethylene, are in principle not diffusion-tight in relation to hydrocarbons. In addition those plastic materials have a tendency to swell in the presence of fuel. For that reason the known fuel tanks of plastic material are provided with a multi-layer wall in which an EVOH layer is embedded as a barrier to hydrocarbons. In that respect the lack of diffusion-tightness of the base material used does not represent a problem.

Usually however fuel tanks are provided with installation fitments which have air intake and venting conduits as well as electrical connections. To produce passage means which pass through the tank wall, it is known for the finished tank to be provided with marked-out circles into which connecting nipples, valves or the like are fitted. The valves, valve covers and nipples are welded to the outside wall of the tank in such a way as to cover the respective opening. Such connecting locations on a plastic tank represent potential leakage points. In order to avoid leakage paths at connections of the fuel tank it is known for connecting nipples and valves to be produced in the form of complicated and expensive two-component structural members, wherein generally those structural members have at least one part comprising a plastic material which is weldable to the tank wall, whereas functional parts on such members usually comprise plastic materials which do not swell in the presence of fuel. Those plastic materials (ABS, POM) generally cannot be welded to the plastic materials used for the tank wall.

Frequently installation fitments, valves and connecting nipples have to be connected to the tank in a manual manufacturing stage after the tank is finished. It is known for example for parts of valves to be latched on the inside of the tank wall and to be connected in positively locking relationship on the outside to weld-on covers, weld-on nipples or the like. The complication and expenditure involved in assembly is considerable.

A process for the production of a fuel tank of thermoplastic material and a fuel tank with connecting elements for hoses or the like is known from EP 1 211 196 A1. EP 1 211 196 A1 describes a dual-shell fuel tank of thermoplastic material with a barrier layer for hydrocarbons, which is embedded in the tank wall and whose shell portions which are assembled to form the tank were produced by thermoforming. In order to ensure ease of mounting connecting elements, while maintaining a high level of permeation sealing integrity for hydrocarbons, EP 1 211 196 A1 proposes a two-part connecting element or a two-part fitting which includes at least an outer portion and an inner portion, wherein the outer portion is welded to the outside wall of the container and the inner portion at least partially passes through the outer portion, with displacement of the container wall and intermediate positioning thereof. That arrangement has the advantage that the container wall is enclosed and displaced between the component parts in such a way that the displaced material serves as a sealing means for the passage assembly passing through the tank wall.

Such a passage means passing through the tank wall can be comparatively easily produced when thermoforming the half-shell portions of the tank, but in contrast such a connection is more difficult to implement when producing the fuel tank by extrusion blow molding.

Therefore the object of the invention is to provide a process for producing a container, in particular a fuel tank of thermoplastic material, with which it is possible to provide connecting elements thereon during the production of the container, with means of the utmost simplicity. In that respect the invention seeks to provide that leakage paths for hydrocarbons in the wall of the container are as far as possible to be avoided or restricted to a minimum.

SUMMARY

In accordance with the invention there is provided a process for the production of a container, in particular a fuel tank of thermoplastic material, by extrusion blow molding, wherein during shaping of the container within a multi-part tool the container is provided with at least one connecting element passing through the wall thereof, wherein with at least a part of the connecting element as a lost shaping male die the wall of the container is displaced and transformed from one side into a mold portion placed on the oppositely disposed side of the container wall and wherein the wall of the container is pierced with the connecting element.

The process according to the invention has the advantage that the connecting element or elements in production of the container are joined to the container while still in the first heat, that is to say while the plastic material is still in the originally plasticised condition. The process steps of circling out openings or cutting off lost blowing heads and welding on attachment fitments by means of friction welding, welding with heat reflectors or the like are eliminated. Damage to the container wall by the connecting element passing therethrough is restricted to a minimum. The connecting element itself is used as a means for piercing the container wall and remains as a lost shaping male die in the container wall. The tool serves in that respect as a female die or receiving means or a support means for the part of the connecting element, which presses through the wall of the fuel tank.

In a preferred variant of the invention the wall of the container is transformed in the tool into a peg-shaped, preferably profiled outwardly displaced portion or protuberance.

Desirably the tool used is a multi-part tool, preferably a tool with a slider. The use of a tool with a slider presents itself in particular when the outwardly displaced portion or protuberance of the container wall, which is produced by the connecting portion, is to form a profiled contour which then can be removed from the mold only by means of such a tool.

For that purpose the connecting element can be provided with a peripherally extending cutting edge or with a spindle with a needle tip.

In the process according to the invention it can be provided that the container is transformed from at least two preforms extruded in web form in a multi-stage mode within a three-part tool.

In that case it is advantageous if the connecting element is placed on the inside of the container and the associated mold portion is placed on the outside of the container.

Furthermore to attain the above-specified object there is provided a fuel tank of thermoplastic material comprising at least one connecting element which is connected to the tank wall at least in region-wise manner with intimate joining of the materials involved, for connection to lines which pass out of or into the tank, wherein the connecting element is in the form of a lost shaping portion which passes at one side through the container wall and which displaces it outwardly, the outwardly displaced portion forms a fitment portion in one piece with the tank wall for a line or a line connection and the connecting element is provided with means for piercing the tank wall.

The connecting element can be in the form of a conical or cylindrical fitting, the peripheral surface of which is provided with what is referred to as a 'Christmas tree profile'.

In addition the connecting element can have an extension for piercing the tank wall. The extension of the connecting element can be of a spindle-like or cannula-like configuration with a peripherally extending cutting edge or can be provided with a needle tip.

DESCRIPTION OF THE DRAWINGS

The invention is described hereinafter by means of an embodiment by way of example illustrated in the drawings in which:

FIG. 1 shows a diagrammatic view of the arrangement of the parts necessary for carrying out the process in the region of the container wall, FIG. 2 shows a diagrammatic view of the step of passing the connecting element through the container wall, the wall of the container being pierced with the connecting element, FIGS. 3 and 4 show removal of the tool in the form of a slider tool from the container wall and removal of the outwardly displaced portion from the mold, and FIGS. 5 through 13 each show respective diagrammatic views representing the operating procedure of shaping the container in the various stages.

In FIG. 1 reference 1 denotes a portion of the preform of the fuel tank to be produced. In the illustrated portion or region the preform 1 forms the wall 19 of the container 10 which is still to be finished.

As shown in FIGS. 1-4, arranged on the inside (the side away from the blow-molding tool) of the preform 1 is a gripper 2 which is provided in the tool that is still to be described, and which as a connecting element receives a connecting projection 3 with a line portion 4 connected thereto. Arranged on the opposite side of the preform 1 (the side nearest the blow-molding tool) is a multi-part tool 5 with a slider 6 which constitutes a mold cavity 7 which accommodates the connecting projection 3 and is of a contour which corresponds to the later contour of the outwardly displaced portion in the wall of the container. The tool 5 can be in the form of a component part of the blow molding tool which is to be described in greater detail hereinafter, but it can also be arranged separately in the blow molding mold.

Figure 6:
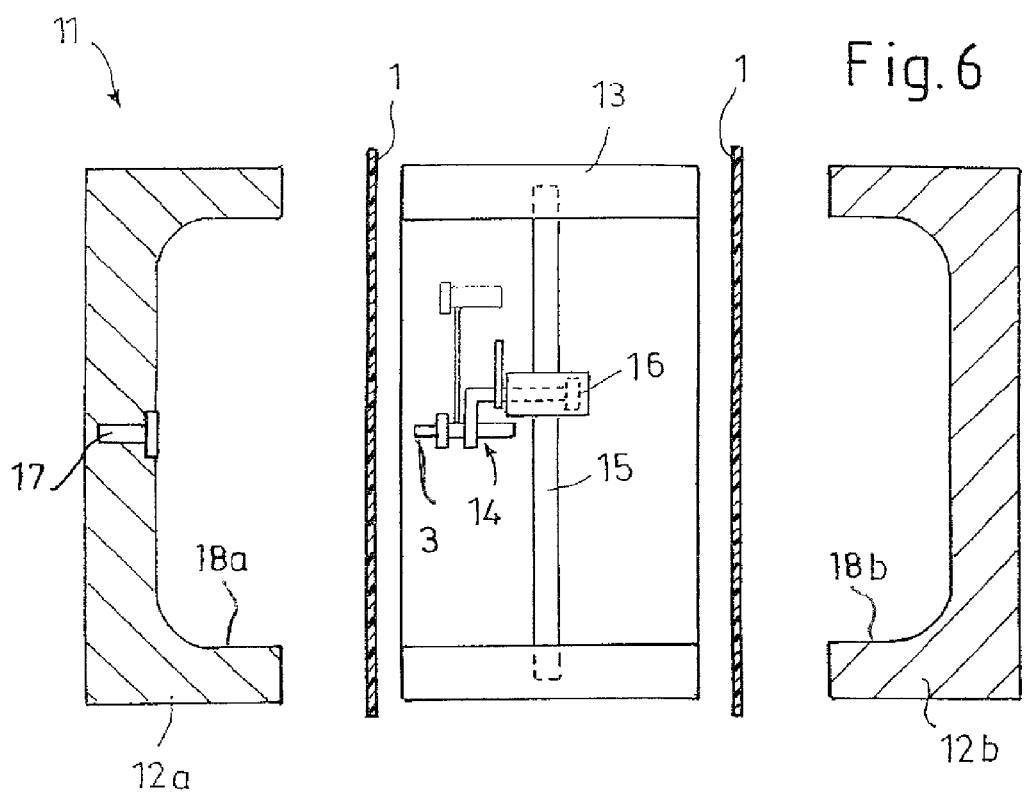
Figure 7:
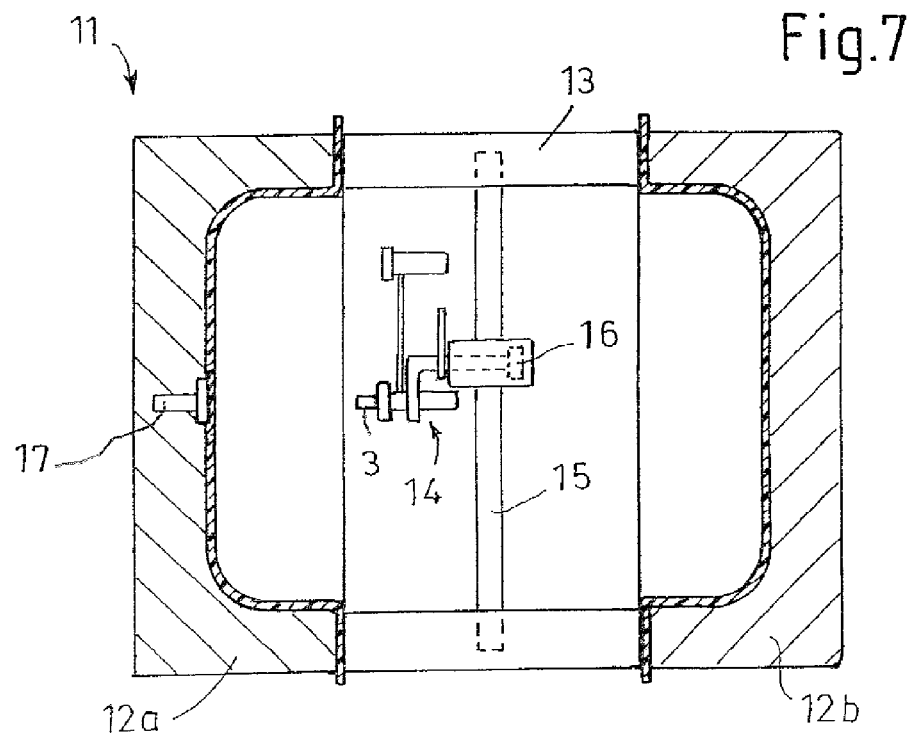
Figure 8:
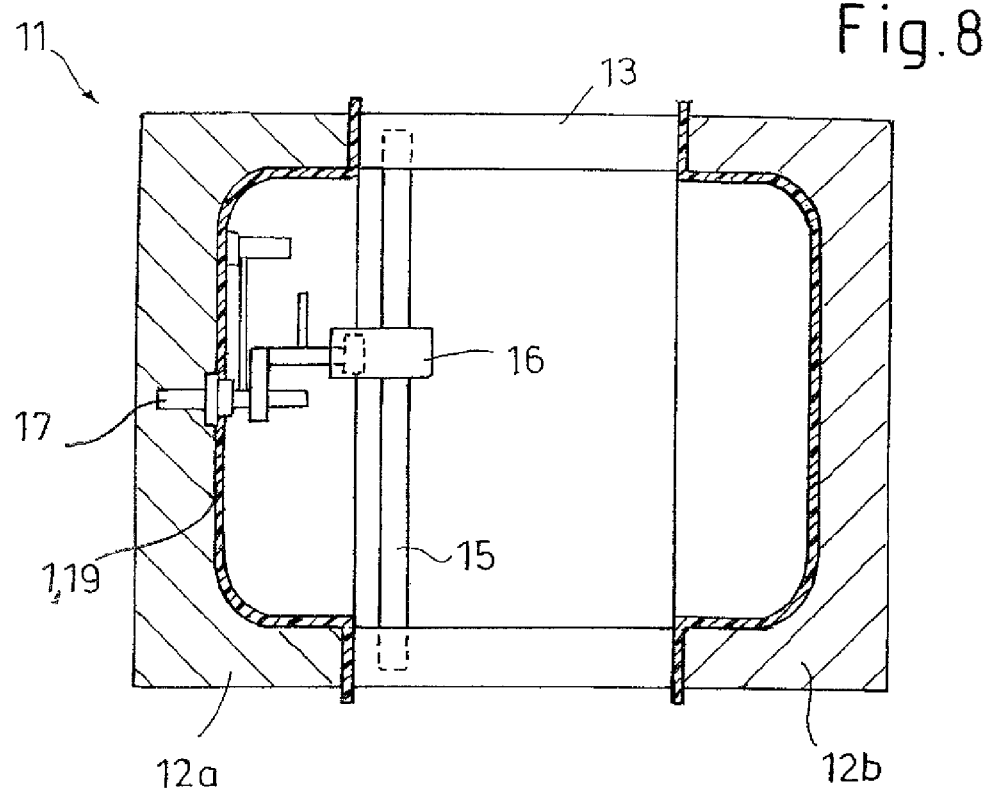
Figure 9:
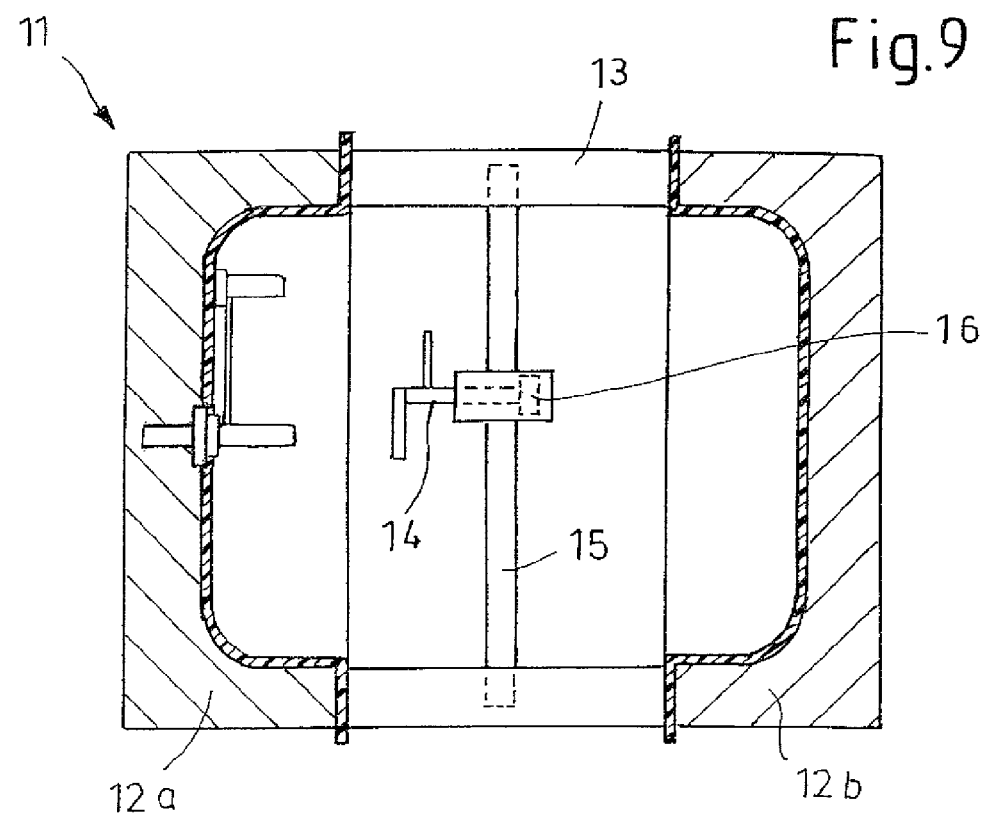
Figure 10:
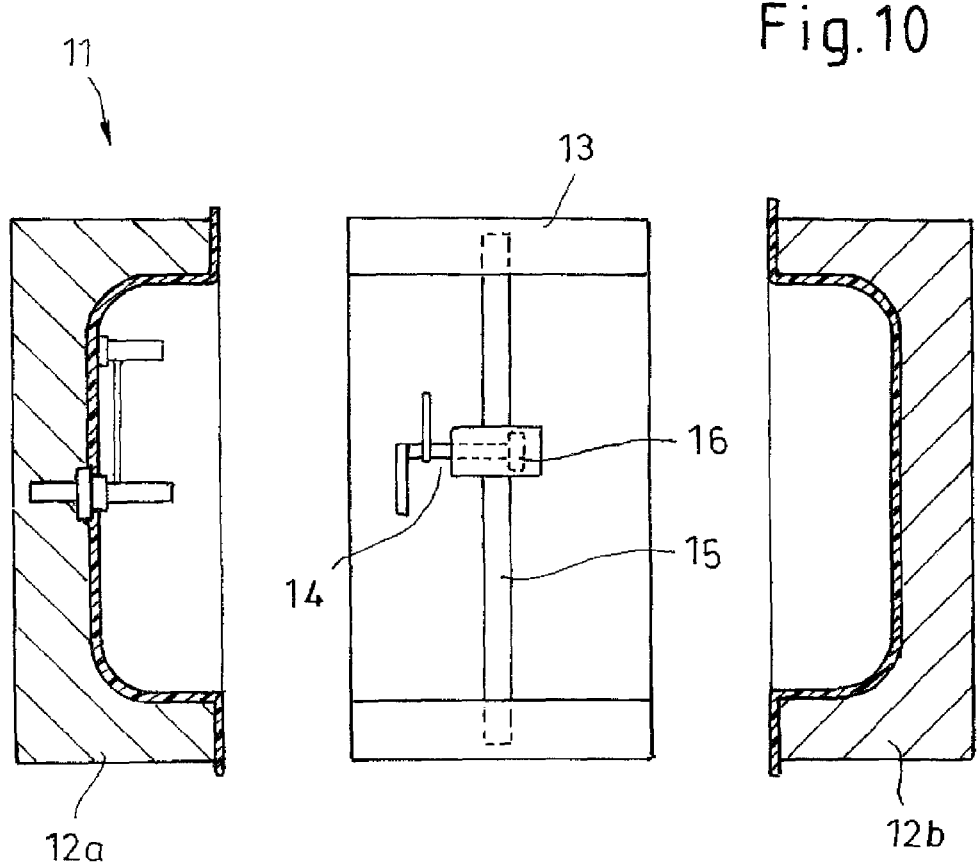
Figure 11:
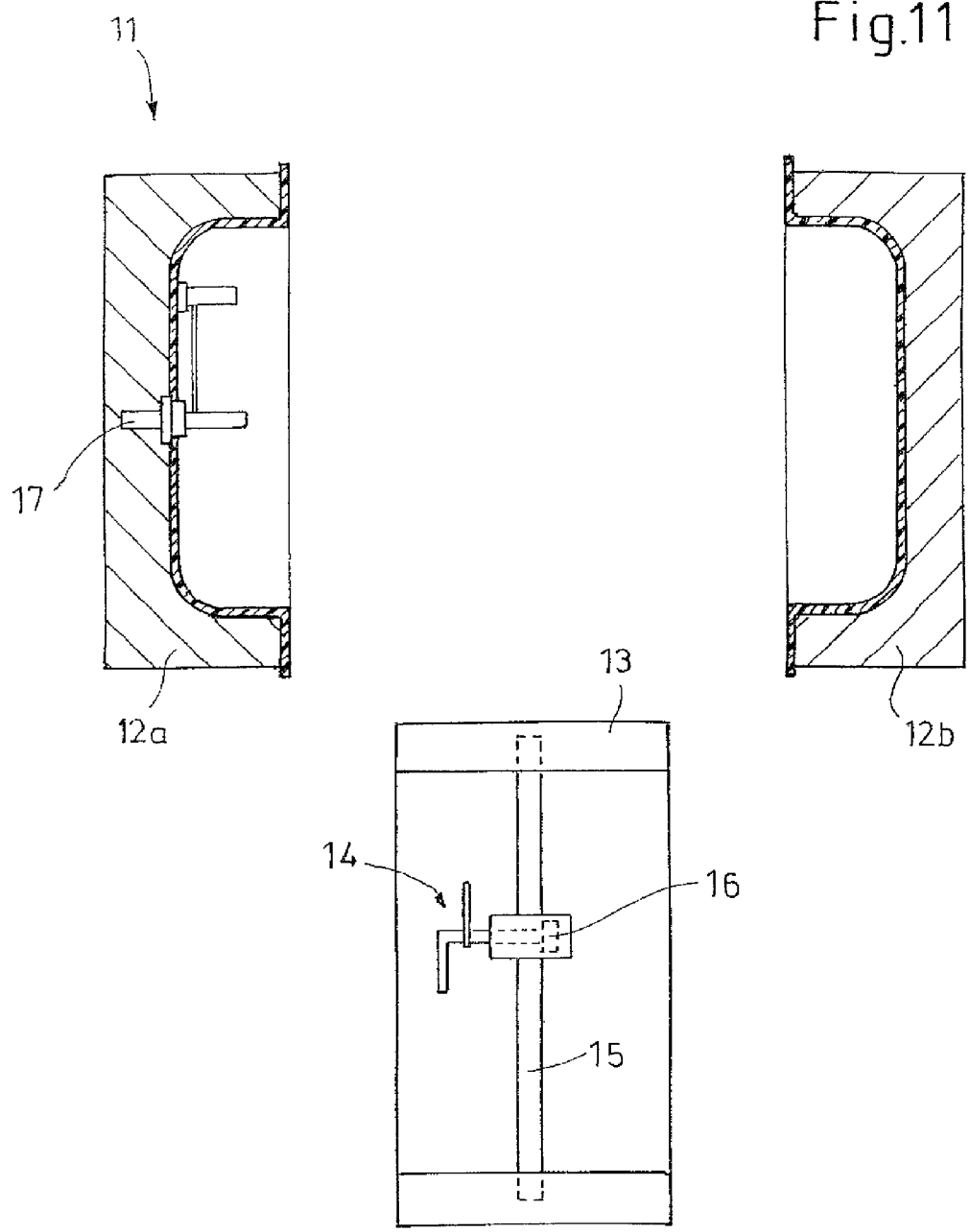
Figure 12:
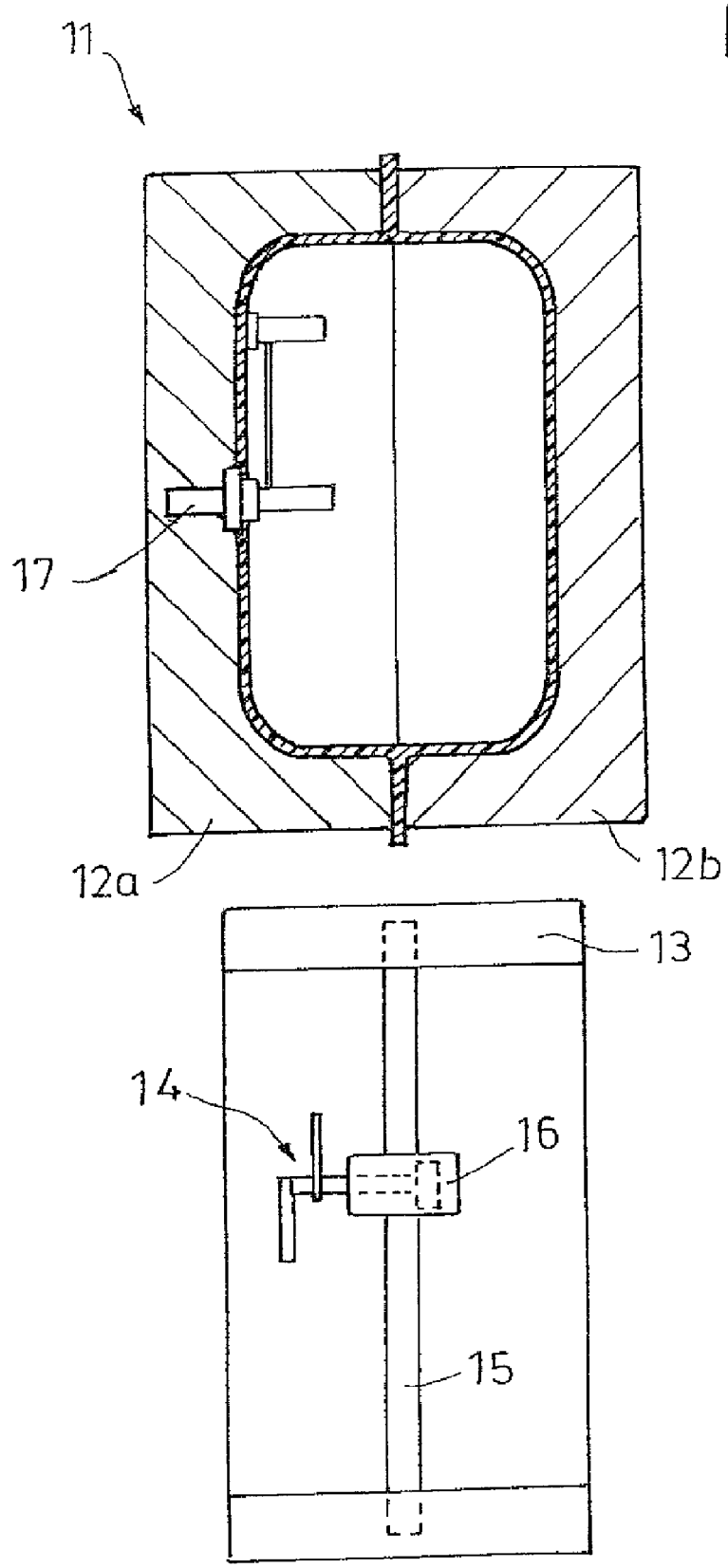

The principle of the process for applying the connecting element to the container wall 19 can be seen from joint consideration of FIGS. 1 through 4. The gripper identified by reference 2 is pushed by way of a manipulator or by way of a pneumatic cylinder or the like, with the connecting projection 3 arranged in the gripper 2, into the preform 1, in which case the preform bears against the tool 5 and the connecting projection penetrates into the mold cavity 7 of the tool 5. In that operation the material of the preform 1 which is still in a plastic condition is displaced with the connecting projection 3 as a shaping male die into the mold cavity 7 and is transformed therein. At the same time the material of the preform 1 flows around the profile of the connecting projection 3, which is of a Christmas tree-like configuration, whereby a positively locking connection is produced between the material of the preform 1 and the connecting projection 3 after the material has cooled.

The connecting projection 3 is provided with a cannula 9 which has a peripherally extending cutting edge. When the gripper 2 is advanced the cannula 9 of the connecting projection 3 pierces through the preform 1 so that the connecting projection 3 passes completely through the preform 1 or the wall 19 of the finished container 10. See FIG. 2. In that case the thermoplastic material of the wall 19 is displaced into the mold cavity 7 and transformed therein. After the connecting projection 3 is introduced into the preform 1 forming the wall 19 of the container the gripper 2 is moved back and the slider 6 is removed from the tool 5 so that the two parts of the tool can be opened. (See FIGS. 3 and 4).

The process for the production of the container 10 can be found in particular in FIGS. 5 through 13. Those Figures show the various manufacturing steps in succession.

DETAILED DESCRIPTION

As already mentioned hereinbefore the container 10 is produced by extrusion blow molding of two preforms 1 in web form. The preforms are continuously extruded from two extrusion heads (not shown in the drawing) with wide-slot nozzles. The extrusion heads (not shown) are arranged above the plane of the drawing in FIGS. 5 through 13. The preforms 1 issuing therefrom are extruded between the open parts of the blow molding tool 11 which then transforms them into the finished container 10 in a multi-stage mode in the procedure to be described hereinafter.

The blow molding tool 11 comprises two outer molds 12a, 12b and a central mold 13, wherein the individual parts of the blow molding tool 11 are mounted on mold mounting plates (not shown) which in turn are displaceable within a closing frame assembly (not shown). The outer molds 12a, 12b are movable away from each other to provide an opening and closing movement of the blow molding tool 11. The central mold 13 is displaceable transversely with respect to the opening and closing movement of the outer molds 12a, 12b.

As shown in FIG. 5 within the central mold 13 a component holder 14 is arranged on a displaceable carrier 15. The component holder 14 in turn is displaceable by means of a pneumatic cylinder 16. In a first production step shown in FIG. 5 the outer molds 12a, 12b are opened in relation to each other and the central mold 13 is disposed outside the path of movement of the outer molds 12a, 12b. In a next step in the process (see FIG. 6) the component holder is provided with tank installation fitments which include for example a valve with a venting line and a connecting projection 3 fixed to the venting line.

The central mold 13 is moved between the outer molds 12a, 12b, then the preforms 1 in web form are expelled from the extrusion heads (not shown) and respectively cut to length between the outer molds 12a, 12b and the central mold 13. (See FIG. 6.) The outer molds 12a, 12b are closed with respect to the central mold 13. The preforms 1 are pulled or pushed into the cavity portions 18a, 18b of the blow molding tool 11 by means of gas pressurisation and/or by means of an externally applied vacuum. (See FIG. 7.)

In a further step the carrier 15 moves out of the central position in a direction towards the outer mold 12a, and the component holder 14 is extended in a direction towards the outer mold 12a by way of the pneumatic cylinder 16. (See FIG. 8.) The connecting member arranged on the component holder, for example the connecting projection 3 (see FIG. 6), penetrates the preform 1 and is pushed into the tool identified by reference 17. In that situation the perform 1, which becomes the wall 19 of the container 10 is displaced outwardly and transformed to constitute a peg-like projection. The tool 17 (as illustrated by reference numeral 5 in FIGS. 1-4) is in the form of a component part of the blow molding tool 11 and is only diagrammatically illustrated in FIGS. 5 through 13.

Figure 13:
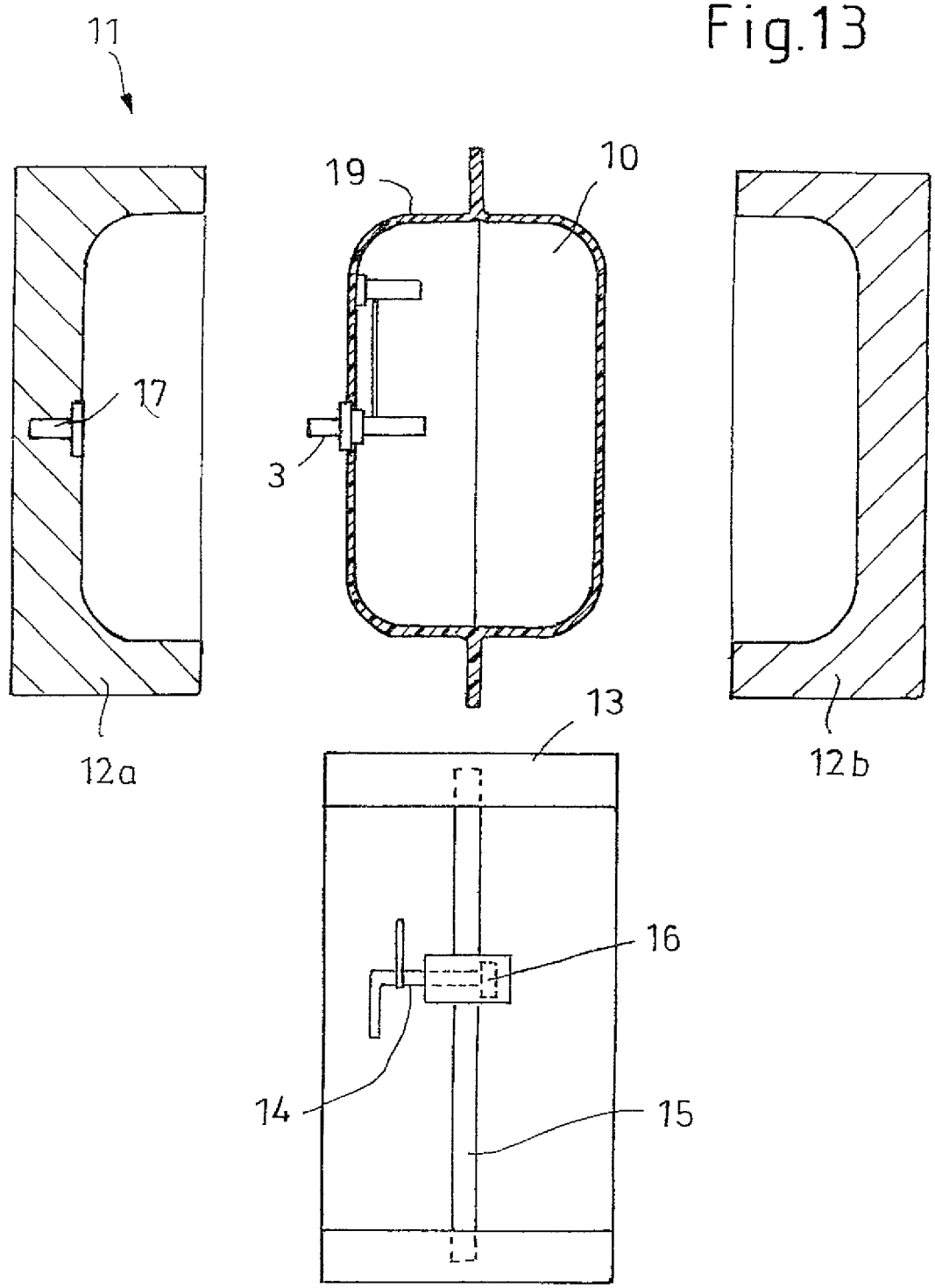
FIG. 13 illustrates an exemplary container 10 including a wall 19.

The carrier 15 is then moved back into its central position again within the central mold 13 (FIG. 9), the outer molds 12a, 12b then open (FIG. 10), the central mold 13 is moved out from between the outer molds 12a, 12b (FIG. 11), the outer molds 12a, 12b are closed again, in such a way that the two intermediate products in the cavity portions 18a, 18b are welded together (FIG. 12) to form the finished container 10 (FIG. 13). In that last stage in the process the container 10 can be expanded once again with the outer molds 12a, 12b in the closed condition, by gas pressurisation within the mold cavity. That would then be effected in the usual manner with a blowing mandrel (not shown) which is disposed between the outer molds 12a, 12b.

Finally FIG. 13 shows removal of the finished container 10 from the mold assembly.

What is claimed is:

1. A process for the production of a container, comprising:

shaping the container of thermoplastic material by extrusion blow molding within a first multi-part tool, wherein during shaping the container is provided with at least one connecting element passing through a wall thereof, wherein with at least a part of the connecting element as a lost shaping male die, the wall of the container is displaced and transformed from one side of the wall into a second tool placed on an oppositely disposed side of the container wall, and wherein the wall of the container is pierced with the connecting element; and wherein the wall of the container displaced and transformed from one side of the wall into the second tool is transformed by the connecting element and the second tool into an outwardly displaced portion which remains part of the wall; and wherein the container includes a passage within the connecting element which passes through the wall of the container when the wall of the container is pierced with the connecting element.

2. The process as set forth in claim 1 characterised in that the wall of the container transformed from one side of the wall into the second tool into an outwardly displaced portion is transformed into a peg-shaped portion.

3. The process as set forth in claim 1 characterised in that the second tool is a multi-part tool.

4. The process as set forth in claim 1 characterised in that said at least one connecting element comprises a configuration with a cutting edge, or a connecting element with a needle tip.

5. The process as set forth in claim 1 characterised in that the container is transformed from at least two preforms extruded in web form within a three-part tool.

6. The process as set forth in claim 1 characterised in that the connecting element is placed on an inside of the container and the second tool is placed on an outside of the container.

* * * * *

UNITED STATES PATENT AND TRADEMARK OFFICE
CERTIFICATE OF CORRECTION

PATENT NO. : 8,287,799 B2
APPLICATION NO. : 11/849451
DATED : October 16, 2012
INVENTOR(S) : Borchert et al.

Page 1 of 1

It is certified that error appears in the above-identified patent and that said Letters Patent is hereby corrected as shown below:

In the Specifications:

In column 1, line 7, under CROSS REFERENCE TO RELATED APPLICATIONS, delete "This application claims priority to U.S. Provisional Application 60/824,486 filed Sep. 5, 2006" and insert -- This application claims priority to German Application DE 10 2006 041 837, filed September 4, 2006 and to U.S. Provisional Application 60/824,486 filed September 5, 2006. --, therefor.

Signed and Sealed this
Fourteenth Day of May, 2013

Teresa Stanek Rea
*Acting Director of the United States Patent and Trademark Office*